United States Patent [19]

Pritchard

[11] Patent Number: 5,063,450
[45] Date of Patent: Nov. 5, 1991

[54] METHOD AND APPARATUS FOR PREVENTING ALIASING IN AN ELECTRONIC STILL CAMERA

[75] Inventor: Jeffrey A. Pritchard, Arleta, Calif.

[73] Assignee: Eastman Kodak Company, Rochester, N.Y.

[21] Appl. No.: 619,092

[22] Filed: Nov. 28, 1990

[51] Int. Cl.$^5$ .................. H04N 3/14; H04N 5/335; H04N 5/30; H04N 3/12

[52] U.S. Cl. .................. 358/213.28; 358/209; 358/212

[58] Field of Search .................. 358/213.28, 213.11, 358/213.13, 209, 212, 163; 250/578; 357/24 LR

[56] References Cited

U.S. PATENT DOCUMENTS

| | | | |
|---|---|---|---|
| 4,554,586 | 11/1985 | Tanuma et al. | 358/213.28 |
| 4,581,649 | 4/1986 | Morokawa | 358/213.28 |
| 4,595,954 | 6/1986 | Endo et al. | 358/213.28 |
| 4,607,287 | 8/1986 | Endo et al. | 358/213.28 |
| 4,612,581 | 9/1986 | Endo et al. | 358/213.28 |
| 4,634,884 | 1/1987 | Hayashimoto et al. | 358/213.28 |
| 4,652,928 | 3/1987 | Endo et al. | 358/213.28 |
| 4,920,418 | 4/1990 | Robinson | 358/213.28 |
| 4,947,239 | 8/1990 | Kondou et al. | 358/213.28 |

Primary Examiner—James J. Groody
Assistant Examiner—Glenton B. Burgess
Attorney, Agent, or Firm—Parkhurst, Wendel & Rossi

[57] ABSTRACT

A method and apparatus for eliminating aliasing in an electronic still camera without the use of a birefringent filter is disclosed. Instead of a birefringent filter, mechanical dithering is utilized to move the pixel elements of a solid-state imager in a controlled manner with respect to an incident image. The movement of the pixel elements by mechanical dithering spreads light from the incident image among neighboring pixels of the image sensor and therefore performs the same function as a birefringent filter to prevent aliasing in an electronic camera.

11 Claims, 2 Drawing Sheets

METHOD AND APPARATUS FOR PREVENTING ALIASING IN AN ELECTRONIC STILL CAMERA

BACKGROUND OF THE INVENTION

The present invention is related generally to a method and apparatus for preventing aliasing in an electronic still camera. In particular, the present invention is related to a method and apparatus for preventing aliasing that employs mechanical dithering in place of a birefringent antialiasing filter used in conventional electronic still cameras.

Advances in the art of electronic imaging have led to the implementation of solid-state image sensors, for example charge coupled devices (CCD imagers), in electronic still image cameras. While such cameras have been proven technically feasible, conventional electronic still image cameras that produce high quality images remain out of the reach of the average consumer due to their prohibitive expense. One significant cost element associated with the production of a high quality electronic still camera is the necessity of incorporating a birefringent antialiasing filter in the camera. The birefringent antialiasing filter is used to spread out or slightly "blur" the image presented to the image sensor in order to limit the spatial frequencies at the image sensor to avoid aliasing. Birefringent filters, in addition to their expense, take up a significant amount of space and light, thereby limiting the sensitivity and increasing the size of any electronic still camera in which they are employed.

In view of the above, it would be desirable to develop a method and apparatus to prevent aliasing in electronic still cameras without using a birefringent filter. The elimination of the birefringent filter would lower the cost, decrease the size, and improve the sensitivity of an electronic still camera. Accordingly, it is an object of the invention to provide a method and apparatus for preventing aliasing that employs mechanical dithering in order to overcome the problems associated with the use of birefringent filters in electronic still cameras.

SUMMARY OF THE INVENTION

The present invention provides a method and apparatus for eliminating aliasing in an electronic still camera without the use of a birefringent filter. Instead of a birefringent filter, the present invention employs mechanical dithering to displace the image sensing pixel elements of a solid-state imager in a controlled manner with respect to an incident image. The movement of the image sensing pixel elements by mechanical dithering spreads light from the incident image among neighboring pixel elements of the image sensor, and therefore performs the same function as a birefringent filter to prevent aliasing in an electronic still camera.

More specifically, an image sensor structure is provided that includes an image sensor device having a plurality of pixel elements arranged in an array. A drive unit, preferably including piezoelectric elements, imparts a controlled two-dimensional motion to the image sensor device. The controlled two-dimensional motion causes image light incident on the image sensor device to be distributed among neighboring pixel elements of the array to prevent aliasing. The image sensor structure can be readily incorporated into an electronic still camera.

BRIEF DESCRIPTION OF THE DRAWINGS

With the above as background, reference should now be made to the following detailed description of the preferred embodiments of the invention and the accompanying drawings for a further explanation of the invention, wherein:

FIGS. 4A-4E illustrate the movement imparted to the image sensing device illustrated in FIG. 2 by the signals applied to the piezoelectric elements.

DETAILED DESCRIPTION OF THE PREFERRED EMBODIMENTS

As stated above, the purpose of a birefringent filter in an electronic still camera is to slightly blur the image projected on an image sensor to limit the spatial frequencies at the image sensor in order to avoid aliasing. The present invention is based on the recognition that the same type of blurring can be accomplished by physically moving the image sensing pixel elements of the image sensor in a controlled fashion to spread out the light from an image focused on the sensor among neighboring pixel elements. The physical movement of the pixel elements, i.e., mechanical dithering, eliminates the need for a birefringent filter and the problems associated therewith. Preferably, the image sensing pixel elements of the image sensor are moved in a circular pattern to spread the image light among neighboring pixel elements, although other patterns may be employed to prevent aliasing. The physical movement of the pixel elements is accomplished by mounting the image sensor in a frame structure that incorporates piezoelectric elements to impart two dimensional movement to the image sensor.

It should be noted that the concept of imparting motion to a solid-state image sensor using piezoelectric elements is known. U.S. Pat. No. 4,634,884 issued to Hayashimoto et al. on Jan. 1, 1987, incorporated herein by reference, discloses a swing-driven solid-state image sensor. Swing-driven solid-state image sensors typically employ piezoelectric elements to horizontally shift the pixel elements of an image sensor to improve resolution. U.S. Pat. No. 4,581,649 issued to Morokawa on Apr. 8, 1986, incorporated herein by reference, also discloses the use of piezoelectric elements to impart motion to an image sensor. Instead of increasing resolution by imparted motion, however, Morokawa imparts motion to compensate for bad image pixel elements in the image sensor. The present invention, in contrast to the above-described conventional uses of piezoelectric elements, imparts motion in a controlled manner to prevent aliasing as will be described in greater detail below.

Figure 1:
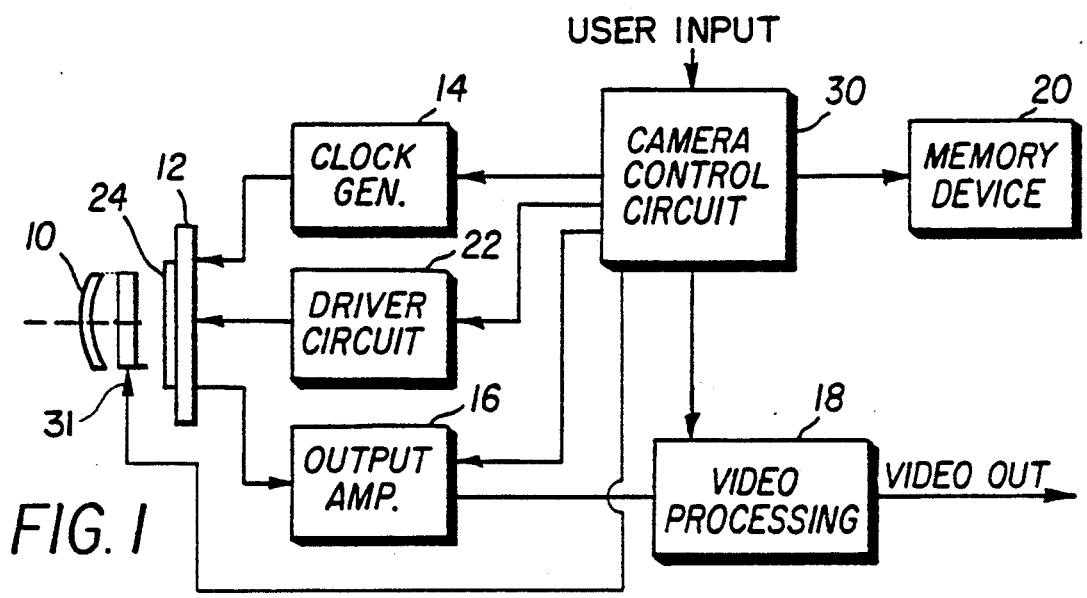
FIG. 1 is a schematic block diagram of a camera structure in accordance with the invention.

Referring now to FIG. 1, an electronic still camera in accordance with the present invention is shown including a lens system 10, an image sensor structure 12, a clock generator 14, an output amplifier 16, a video processing circuit 18, a memory device 20, and a piezoelectric driver circuit 22. The lens system 10 focuses image light onto a solid-state image sensor device 24 located within the image sensor structure 12. The image sensor device 24 is preferably a conventional full frame solid-state image sensor. The clock generator 14 supplies the necessary clocking signals to drive the image sensor device 24 during operation. An output signal of the image sensor device 24 is supplied to the output amplifier 16 which amplifies and supplies the output signal to the video processing circuit 18. A video output signal is then generated by the video processing circuit 18. The video output signal is either output directly from the camera or stored in the memory device 20. The memory device 20 may include, for example, a solid state memory storage unit employing discrete solid state memory devices, a magnetic disc storage device, or an optical disc storage device. Although not specifically shown, a shutter mechanism is employed to control the exposure of the image sensor device 24 to the image light. A conventional mechanical shutter or liquid crystal shutter mechanism 31 can be employed. Alternatively, electronic techniques can be applied to the operation of the image sensor device 24 in a conventional manner to obtain the desired exposure period. A camera control circuit 30 controls the overall operation of the camera in response to various operator inputs.

Figure 2:
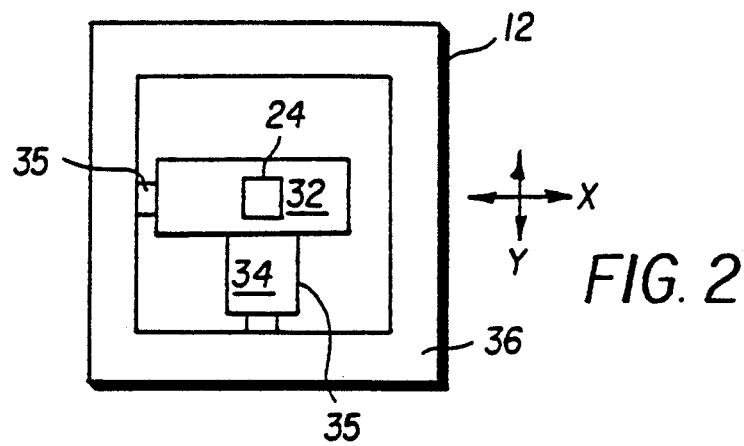
FIG. 2 illustrates a first embodiment for mounting an image sensor device in the camera illustrated in FIG. 1.
Figure 3:
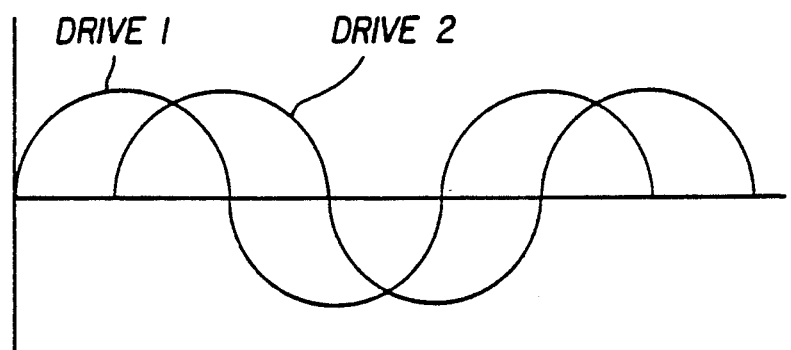
FIG. 3 illustrates signals applied to piezoelectric elements contained within the structure illustrated in FIG. 2.
Figures 4A, 4B:
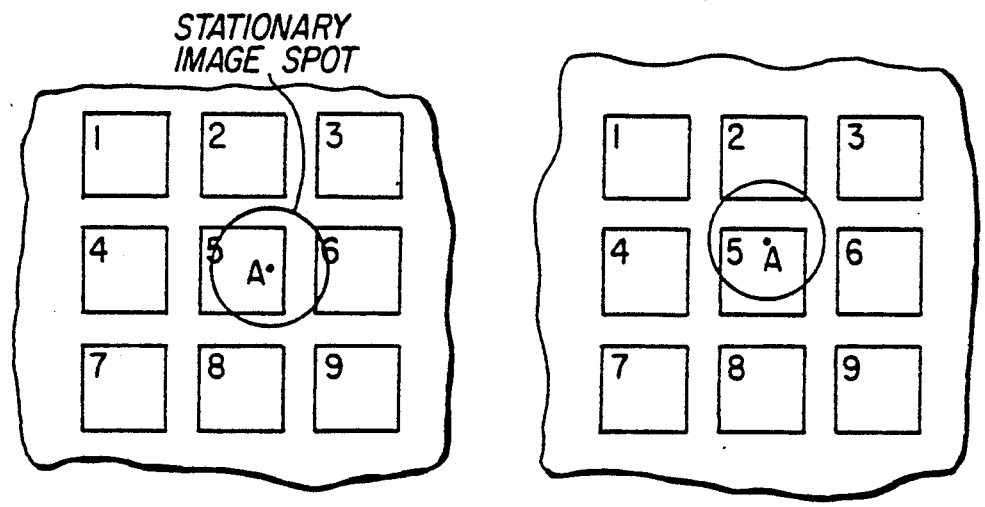
Figures 4C, 4D:
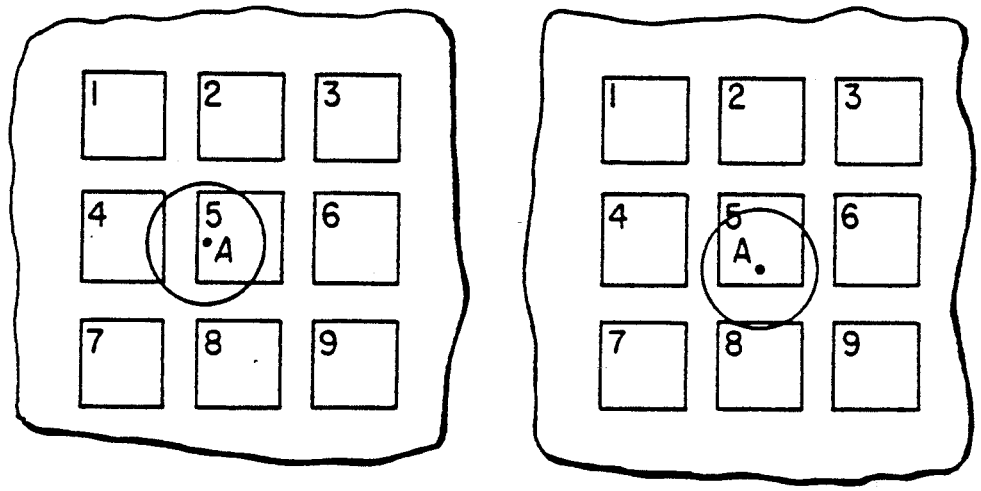

The function and operation of the piezoelectric driver circuit 22 will be described with reference to FIG. 2, which illustrates the mounting of the image sensor device 24 within the image sensor structure 12. The image sensor device 24 is mounted on a first piezoelectric element 32, which in turn is mounted on a second piezoelectric element 34. One end of each of the first and second piezoelectric elements 32 and 34 are coupled to the frame assembly 36 by a flexible coupling 35. The flexible coupling 35, for example an elastomer material, permits movement of the piezoelectric elements 32 and 34 when drive signals are applied thereto by the piezoelectric driver circuit 22 which is coupled to both the first and second piezoelectric elements 32, 34. The drive signals applied by the piezoelectric driver circuit 22 are sinusoidal drive signals (DRIVE1, DRIVE2) that are 90 degrees out of phase with one another as illustrated in FIG. 3. The drive signals cause the piezoelectric elements 32, 34 to oscillate, with the piezoelectric element 32 moving in the X direction and the piezoelectric element 34 moving in the Y direction. The combined oscillation of the piezoelectric elements 32, 34 causes the image sensor device 24 to move in a substantially circular pattern about a point A, thereby spreading the light from an image spot focused at point A among neighboring image pixel elements in a controlled fashion. FIGS. 4A-4D illustrate the movement of the image sensor device 24 with respect to a given image spot focused at point A.

Figure 5:
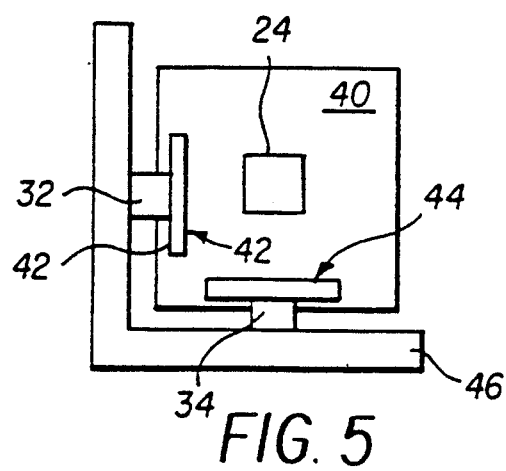
FIG. 5 illustrates a second embodiment for mounting an image sensor device in the camera illustrated in FIG. 1.

A second embodiment for mounting the image sensor device 24 in the image sensor structure 12 is illustrated in FIG. 5. The image sensor device 24 is mounted on an elastic pad 40, such as a rubber pad, having two pressure bars 42, 44 mounted thereon. The two piezoelectric elements 32, 34 are respectively mounted between the pressure bars 42, 44 and a frame 46. The piezoelectric elements 32, 34 are coupled to the piezoelectric driver circuit 22 in a manner similar to the embodiment illustrated in FIG. 3. The application of sinusoidal signals to the piezoelectric elements 32, 34 causes a force to be imparted to the pressure bars 42, 44, which in turn is transmitted to the elastic pad 40 causing the image sensor device 24 to move in a circular pattern. The movement of the image sensor device 24 results in incident image light being spread between neighboring pixel elements of the image sensor device 24.

The invention has been described with reference to certain preferred embodiments thereof. It will be understood, however, that modifications and variations are possible with the spirit and scope of the appended claims. For example, other structures other that the illustrated piezoelectric elements may be employed to impart two-dimensional movement to the image sensor device. In addition, the invention is not limited to imparting a circular pattern of movement to the image sensor. Other patterns may be readily employed as long as the image light is sufficiently distributed among neighboring pixels to prevent aliasing.

What is claimed is:

1. An image sensor structure comprising: an image sensor device including a plurality of pixel elements arranged in an array; drive means for imparting a controlled two-dimensional motion to said image sensor device; means for controlling an exposure operation of said image sensor device while said drive means is imparting said controlled two-dimensional motion, wherein said controlled two-dimensional motion causes light incident on said image sensor device during said exposure operation to be distributed among neighboring pixel elements of said array to prevent aliasing.

2. An image sensor structure as claimed in claim 1, wherein said drive means for imparting a controlled two-dimensional motion includes electromechanical elements.

3. An image sensor structure as claimed in claim 2, wherein said electromechanical elements comprise piezoelectric elements.

4. An image sensor structure as claimed in claim 3, wherein said drive means for imparting a controlled motion further comprises means for generating sinusoidal signals and applying said sinusoidal signals to said piezoelectric elements.

5. An image sensor structure comprising: an image sensor device including a plurality of pixel elements arranged in an array; drive means for imparting a controlled two-dimensional motion to said image sensor device, said drive means including piezoelectric elements and means for generating sinusoidal signals and applying said sinusoidal signals to said piezoelectric elements; means for controlling an exposure operation of said image sensor device while said drive means is imparting said controlled two-dimensional motion, wherein said controlled two-dimensional motion causes light incident on said image sensor device during said exposure operation to be distributed among neighboring pixel elements of said array to prevent aliasing;

wherein said piezoelectric elements include first and second piezoelectric elements and said sinusoidal signals include first and second sinusoidal signals out of phase by 90 degrees that are respectively applied to said first and second piezoelectric elements.

6. An electronic camera comprising: means for focusing image light on an image sensor device including a plurality of pixel elements arranged in an array; drive means for imparting a controlled two-dimensional motion to said image sensor device, means for controlling an exposure operation of said image sensor device to generate an output signal corresponding to said image light while said drive means is imparting said controlled two-dimensional motion to said image sensor device, wherein said controlled two-dimensional motion causes said image light during said exposure operation to be distributed among neighboring pixel elements of said array thereby preventing aliasing.

7. An electronic camera as claimed in claim 6, wherein said drive means for imparting a controlled motion includes electromechanical elements.

8. An electronic camera as claimed in claim 7, wherein said electromechanical elements comprise piezoelectric elements.

9. An electronic camera as claimed in claim 8, wherein said drive means for imparting a controlled motion further comprises means for generating sinusoidal signals and applying said sinusoidal signals to said piezoelectric elements.

10. An electronic camera comprising: means for focusing image light on an image sensor device including a plurality of pixel elements arranged in an array; drive means for imparting a controlled two-dimensional motion to said image sensor device, said drive means including piezoelectric elements and means for generating sinusoidal signals and applying said sinusoidal signals to said piezoelectric elements; means for controlling an exposure operation of said image sensor device to generate an output signal corresponding to said image light while said drive means is imparting said controlled two-dimensional motion to said image sensor device;
    wherein said piezoelectric elements include first and second piezoelectric elements and said sinusoidal signals include first and second sinusoidal signals out of phase by 90 degrees that are respectively applied to said first and second piezoelectric elements; and
    wherein said controlled two-dimensional motion causes said image light during said exposure operation to be distributed among neighboring pixel elements of said array thereby preventing aliasing.

11. A method of preventing aliasing in an electronic camera comprising the steps of: focusing image light on an image sensor device including an array of picture elements; imparting a controlled two-dimensional motion to said image sensor device; and exposing said picture elements to said image light while said controlled two-dimensional motion is imparted to said image sensor device, wherein said image light is distributed among neighboring picture elements of said array in order to prevent aliasing.

* * * * *